US 8,041,027 B2

(12) United States Patent
Wang

(10) Patent No.: US 8,041,027 B2
(45) Date of Patent: Oct. 18, 2011

(54) ELECTRICITY ECHO CANCELLATION DEVICE AND METHOD

(75) Inventor: Wei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 638 days.

(21) Appl. No.: 12/140,376

(22) Filed: Jun. 17, 2008

(65) Prior Publication Data

US 2008/0247559 A1 Oct. 9, 2008

Related U.S. Application Data

(63) Continuation of application No. PCT/CN2006/001592, filed on Jul. 6, 2006.

(30) Foreign Application Priority Data

Dec. 13, 2005 (CN) .......................... 2005 1 0134638

(51) Int. Cl.
*H04M 9/08* (2006.01)
(52) U.S. Cl. .................................. 379/406.03
(58) Field of Classification Search .............. 379/406.03
See application file for complete search history.

(56) References Cited

U.S. PATENT DOCUMENTS

| 6,324,170 B1 * | 11/2001 | McClennon et al. ......... 370/286 |
| 6,590,975 B1 | 7/2003 | Ariyama |
| 6,724,736 B1 | 4/2004 | Azriel |
| 6,792,106 B1 | 9/2004 | Liu |
| 7,304,962 B1 | 12/2007 | Kirla et al. |
| 2002/0064139 A1 * | 5/2002 | Bist et al. ..................... 370/289 |
| 2002/0114445 A1 | 8/2002 | Benesty et al. |

FOREIGN PATENT DOCUMENTS

| CN | 1691716 A | 11/2005 |
| EP | 0 986 190 A2 | 3/2000 |
| WO | 01/45291 A1 | 6/2001 |

OTHER PUBLICATIONS

Melvin et al., "An Integrated NTP-RTCP Solution to Audio Skew Detection and Compensation for VOIP Applications," *Multimedia and Expo* (*IEEE*), 2, 537-540 (Jul. 2003).
European Patent Office, Communication under Rule 71(3) EPC, Notice to Grant in European Patent Application 06753115.2 (Jun. 30, 2010).

* cited by examiner

*Primary Examiner* — Alexander Jamal
(74) *Attorney, Agent, or Firm* — Leydig, Voit & Mayer, Ltd.

(57) ABSTRACT

An electricity echo cancellation device applied at a terminal includes: an input buffer memory module, a network echo delay computation module and an adaptive filtering module. The adaptive filtering module includes an adaptive filter, a subtracter and a dual-ended voice detection module. An electricity echo cancellation method includes: calculating a network echo delay according to relevant information of an RTCP packet transmitted from the network; and dynamically adjusting a terminal input signal to be adaptively filtered according to the network echo delay. The present invention ensures the electricity echo cancellation effect at the final user end on the whole, and improves the effectiveness of electricity echo cancellation. Meanwhile method of the present invention can be realized with software, thus avoiding influences of hardware memory restricts on the echo cancellation effect. In addition, the present invention only needs a single-point deployment, and thus the cost is saved.

18 Claims, 3 Drawing Sheets

ELECTRICITY ECHO CANCELLATION DEVICE AND METHOD

CROSS REFERENCE TO RELATED APPLICATIONS

This application is a continuation of International Patent Application No. PCT/CN2006/001592, filed Jul. 6, 2006, which claims priority to Chinese Patent Application No. 200510134638.5, filed Dec. 13, 2005, both of which are hereby incorporated by reference in their entirety.

FIELD OF THE INVENTION

The present invention relates to the field of echo cancellation, and more particularly to an electricity echo cancellation device and method applied in a terminal.

BACKGROUND

With the continuous development of the Internet and telecommunication technologies, telecommunication applications over the Internet become more numerous. Recently, great development of the Voice over IP (VOIP) technology has been achieved. However, compared with the conventional telephone technologies, the VOIP technology has disadvantage in its voice quality for a main reason of echoes.

Figure 1:
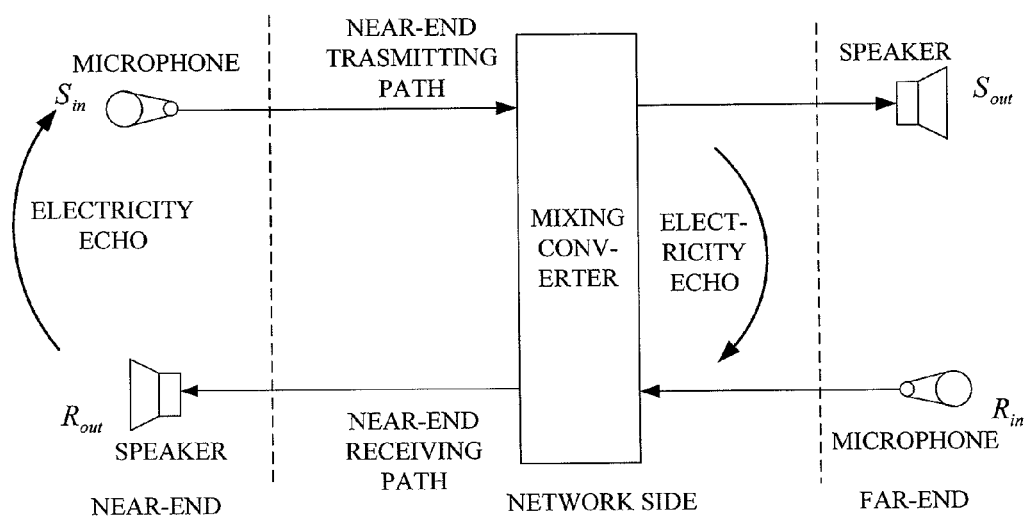

According to the generation principles, echoes are classified into acoustic echo and electricity echo. As shown in FIG. 1, $S_{in}$ represents a near-end input signal, $S_{out}$ represents a near-end output signal, $R_{in}$ represents a far-end input signal, and $R_{out}$ represents a far-end output signal. Taking the near-end as an example, the generation principle of electricity echoes is as follows. When the near-end input signal $S_{in}$ is transmitted in the Public Switched Telephone Network (PSTN), a mixing converter is needed to convert the two-line at the user end to the four-line in an exchanger. During the conversion, a part of signals are leaked from a near-end transmitting path to a near-end receiving path. This part of "leaked" signals is retransmitted to the near-end, and thereby a near-end user hears his/her own voices. This is electricity echo. Also taking the near-end as an example, the generation principle of acoustic echoes is as follows. The acoustic echo is caused by voice coupling between a voice playback device and a voice collection device. The far-end input voice signal $R_{in}$, after transmitted to the near-end, becomes the far-end output voice signal $R_{out}$. After the signal $R_{out}$ is received by the near-end voice playback device, such as a speaker, and picked up by the near-end voice collection device, such as a microphone, via various reflecting paths or without any reflection, the signal $R_{out}$ is retransmitted to the far-end, and thereby a far-end user hears his/her own voices. This is acoustic echo.

Generally, typical echoes with a delay of 16~20 ms are called sidetone, which are even desired by a user because the user may feel comfortable when hearing it in a talking. However, echoes with a delay of more than 32 ms would seriously influence the quality of a talking. With the development of communication technologies, talking distance supported by the VOIP technology is becoming longer and thus voice delay increases greatly, so that echo phenomenon is becoming much more serious. Therefore, echo cancellation becomes a problem to be overcome for the VOIP technology.

Presently, electricity echo cancellation is realized by an electricity echo canceller deployed on network. Taking the near-end in FIG. 1 as an example, the operation principle of an electricity echo canceller is as follows. Because an electricity echo signal r in the near-end is generated from the near-end input signal $S_{in}$ with certain delay and returned to the near-end together with the far-end input signal $R_{in}$ through the far-end output signal $R_{out}$, when no voice signal is inputted in the far-end, that is, $R_{in}$ is not a voice signal, an electricity echo delay M might be estimated according to the correlation of the far-end output signals $R_{out}$ and $S_{in}$. Then a near-end input signal $S_{in}(n-M)$ at the time earlier than the current time n by M, i.e. the time (n-M), is selected as an input signal of an adaptive filter, and an estimated electricity echo signal r' is derived through filtering computation. Then the estimated electricity echo signal r' is subtracted from the far-end input signal $R_{in}$, and thus the purpose of eliminating the electricity echo in the far-end output signal is achieved. During the above process, the far-end output signal $R_{out}$ should be used as a correction signal in order to continuously update coefficients of the adaptive filter, so that the estimated electricity echo signal could approach an actual electricity echo signal more exactly.

The principle of acoustic echo cancellation is similar to that of electricity echo cancellation except that an acoustic echo canceller (AEC) is generally deployed in a terminal.

The related art might bring about the following problems.

1. It is difficult for the conventional electricity echo canceller to ensure the electricity echo cancellation effect at the final user end on the whole. An electricity echo canceller could only eliminate electricity echo signals on the network where it is deployed. However, because an actual network is constructed by interconnecting sub-networks based on various network technology, an electricity echo canceller deployed in a certain sub-network could only eliminate electricity echo signals on this sub-network, and could not ensure the electricity echo cancellation effect on the whole network.

2. Influences of network transmission performance on the electricity echo cancellation effect are not considered. For a voice transmission network, its transmission performance may vary at different times due to various reasons, and thereby imposing influences on echo signals, for example, distorting echo signals. The conventional electricity echo cancellation method estimates an echo delay according to the correlation of media signals only in terms of media transmission, with no concern of the problem of inaccurate estimations on echo delay caused by influences of network transmission performance on echo signals, and thereby the echo cancellation effect could not be ensured. Further, because to estimate an electricity echo delay according to the correlation of media signals incurs a large amount of calculations, an electricity echo canceller usually needs to be realized with specific chips, and it is needed to deploy electricity echo cancellers on network in a multi-point manner, and the cost is high.

3. The electricity echo cancellation effect is restricted by hardware memory. During eliminating electricity echoes, terminal input signals in a previous time period need to be saved so as to serve as reference signals for estimating electricity echo signals. Because of limited hardware memory, when transmission delay is long, a terminal input signal corresponding to the current electricity echo signal might have been discarded by the hardware memory, and thereby the electricity echo cancellation effect could not be ensured.

SUMMARY

The present invention provides an electricity echo cancellation device and method for ensuring the electricity echo cancellation effect on the whole and improving the effectiveness of electricity echo cancellation.

Technical solutions of the present invention are implemented as follows.

An electricity echo cancellation device includes an input buffer memory module and an adaptive filtering module configured to calculate an electricity echo signal and a network output signal. The electricity echo cancellation device is applied at the terminal and further includes a network echo delay computation module configured to calculate a network echo delay according to a Real Time Control Protocol (RTCP) packet transmitted from the network. The input buffer memory module is configured to determine a terminal input signal to be adaptively filtered according to information of the network echo delay most recently outputted from the network echo delay computation module, and output the terminal input signal to the adaptive filtering module.

The adaptive filtering module includes an adaptive filter, a subtracter and a dual-ended voice detection module. The adaptive filter is configured to calculate the electricity echo signal according to the terminal input signal outputted from the input buffer memory module and a filtering coefficient maintained in the adaptive filter, output the electricity echo signal to the subtracter, adjust the current filtering coefficient according to the network output signal outputted from the subtracter, and interrupt the adjustment of the current filtering coefficient after receiving a signal for interrupting coefficient adjustment from the dual-ended voice detection module. The subtracter is configured to subtract the electricity echo signal outputted from the adaptive filter from a network input signal from the network, and output the network output signal derived through the subtraction to the terminal and the adaptive filter. The dual-ended voice detection module is configured to detect whether the current time is a dual-ended voice time according to the network input signal from the network and the terminal input signal from the input buffer memory module, and if the current time is a dual-ended voice time, output a signal for interrupting coefficient adjustment to the adaptive filter.

In accordance with an electricity echo cancellation method, a network echo delay is calculated according to an RTCP packet when the RTCP packet arrives and the current network echo delay is updated with the network echo delay. The method includes: determining a terminal input signal to be adaptively filtered according to the current network echo delay and an adaptive filtering algorithm; calculating an electricity echo signal by performing adaptive filtering on the terminal input signal; and calculating the difference between a network input signal and the electricity echo signal to obtain a network output signal.

Calculating the network echo delay according to the RTCP packet includes: subtracting, from a Network Time Protocol (NTP) time at which the RTCP packet arrives, a time, carried by the RTCP packet, at which a transmitted packet is most recently received, and further subtracting a time interval between the time at which a transmitted packet is most recently received and the time at which the RTCP packet is transmitted; and dividing the resulting difference derived through the two subtractions by a sampling time interval to obtain the network echo delay.

The electricity echo signal is calculated as $$r(n) = \sum_{m=0}^{M-1} e(n)_m \cdot X(n-K-m),$$

where n is the current time, M is the total order of adaptive filtering, K is the current network echo delay updated in step B, r(n) is the current electricity echo signal, $e(n)_m$ is the current filtering coefficient of the $m^{th}$ order, and x(n−K−m) is the terminal input signal at the time (n−K−m).

The method further includes determining whether the current time is a dual-ended voice time; and if the current time is a dual-ended voice time, maintaining the current filtering coefficient unchanged, and if the current time is not a dual-ended voice time, adjusting the current filtering coefficient according to the adaptive filtering algorithm.

Determining whether the current time is a dual-ended voice time includes determining whether the condition $|Y_{out}(n)|-C*\max(|X(n)|,|X(n-1)|,\ldots,|X(n-L+1)|)>0$ is met; and if the condition is met, determining the current time is a dual-ended voice time, and if the condition is not met, determining the current time is not a dual-ended voice time; where n is the current time, C and L are constants determined experientially, $Y_{out}(n)$ is the network output signal in step C, x(n) is the terminal input signal at the current time, x(n−1) is the terminal input signal at the time (n−1), and x(n−L+1) is the terminal input signal at the time (n−L+1).

The current filtering coefficient is adjusted as $$e(n+1) = e(n) + \mu * \frac{\Delta(n)}{P(n-K)} * X(n-K),$$

where n is the current time, μ is a constant, K is the current network echo delay updated in step B, e(n) is the current filtering coefficient, e(n+1) is the adjusted filtering coefficient, Δ(n) is the network output signal in step C, x(n−K) is the terminal input signal at the time (n−K), and $P(n-K)=X^T(n-K)*X(n-K)$ where $X^T(n-K)$ is the transposed vector of X(n−K).

Compared with the related art, the electricity echo cancellation device according to the present invention is deployed at the terminal, thus ensuring the electricity echo cancellation effect at the final user end on the whole, and improving the effectiveness of electricity echo cancellation through adjusting a terminal input signal outputted to an adaptive filtering module according to a network echo delay outputted from a network echo delay computation module. The electricity echo cancellation method according to the present invention includes calculating a network echo delay according to relevant information of an RTCP packet transmitted from the network and dynamically adjusting a terminal input signal to be adaptively filtered according to the network echo delay, thus improving the effectiveness of echo cancellation. Meanwhile, method of the present invention can be realized with software, thus avoiding influences of hardware memory restricts on the echo cancellation effect. In addition, the present invention only needs a single-point deployment, and thus the cost is saved.

BRIEF DESCRIPTION OF THE DRAWING(S)

Figure 2:
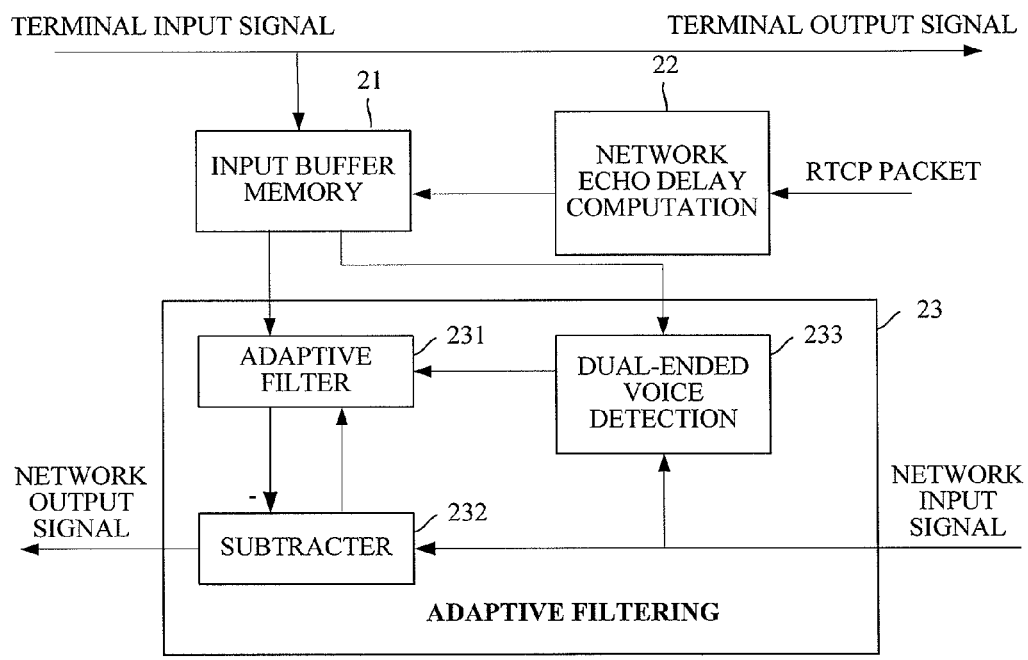
Figure 3:
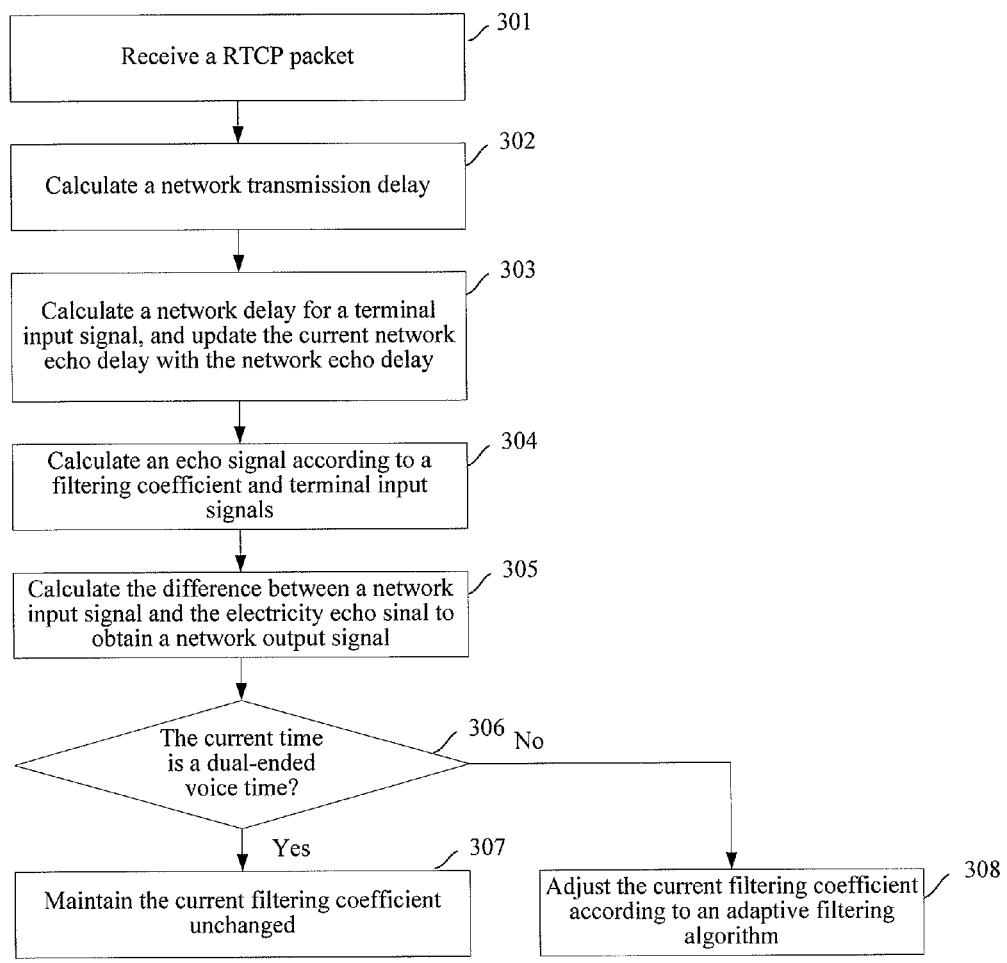

FIG. 1 is a conceptual graph of echo generation;
FIG. 2 is a block diagram of the configuration of an electricity echo cancellation device according to an embodiment of the present invention; and
FIG. 3 is a flow chart of an electricity echo cancellation method according to an embodiment of the present invention.

DETAILED DESCRIPTION

The present invention is further explained below by reference to the accompanying drawings and detailed embodiments.

FIG. 2 is a block diagram of the configuration of an electricity echo cancellation device according to an embodiment of the present invention, which is deployed at the terminal. As shown in FIG. 2, the device mainly includes: an input buffer memory module 21, a network echo delay computation module 22 and an adaptive filtering module 23.

The input buffer memory module 21 is configured to: receive and save a terminal input signal X(n); determine a terminal input signal to be adaptively filtered according to a network echo delay K most recently outputted from the network echo delay computation module 22; and output the terminal input signal to be adaptively filtered to the adaptive filtering module 23.

Herein, n represents the current time.

Particularly, X(n−K) is used as a terminal input signal corresponding to the current network input signal Y(n), and the terminal input signal to be adaptively filtered is outputted to the adaptive filtering module 23 according to an adaptive filtering algorithm's requirements. For example, if the Normalized Least Mean Square (NLMS) algorithm is employed as the adaptive filtering algorithm, X(n−K), X(n−K−1), X(n−K−2), . . . , X(n−K−M+1) are outputted to the adaptive filtering module 23 as terminal input signals to be adaptively filtered, where M is the filtering order of the adaptive filtering module 23.

The network echo delay computation module 22 is configured to: receive a Real Time Control Protocol (RTCP) packet from the network; calculate a network echo delay K according to a Network Time Protocol (NTP) time A at which the RTCP packet arrives, the time (LSR), carried by the RTCP packet, at which a transmitted packet (SR) is most recently received, a time interval (DLSR) between the time at which SR is most recently received and the transmitting time of the RTCP packet, and a sampling time interval t; and output the network echo delay K to the input buffer memory module 21.

The adaptive filtering module 23 is configured to: calculate an electricity echo signal r(n) according to the terminal input signal to be adaptively filtered, outputted from the input buffer memory module 21 and the current filtering coefficient e(n) maintained in the adaptive filtering module 23; subtract the electricity echo signal r(n) from the network input signal Y(n) from the network and output a network output signal $Y_{out}(n)$ derived through the subtraction to the outside; and when the current time is not a dual-ended voice time, adjust the current filtering coefficient e(n) according to the network output signal $Y_{out}(n)$ and the terminal input signal X(n).

Further, as shown in FIG. 2, the adaptive filtering module 23 includes: an adaptive filter 231, a subtracter 232 and a dual-ended voice detection module 233.

The adaptive filter 231 is configured to: calculate the electricity echo signal r(n) according to the terminal input signal to be adaptively filtered, outputted from the input buffer memory module 21 and the current filtering coefficient e(n) maintained in the adaptive filter 231; output the electricity echo signal r(n) to the subtracter 232; adjust the current filtering coefficient e(n) according to the network output signal $Y_{out}(n)$ outputted from the subtracter 232 and the terminal input signal X(n); and interrupt the adjustment of the current filtering coefficient e(n) after receiving a signal for interrupting coefficient adjustment transmitted from the dual-ended voice detection module 233.

The subtracter 232 is configured to: subtract the electricity echo signal r(n) outputted from the adaptive filter 231 from the network input signal Y(n) from the network; and output the network output signal $Y_{out}(n)$ derived through the subtraction to the outside and the adaptive filter 231.

The dual-ended voice detection module 233 is configured to: detect whether the current time is a dual-ended voice time according to the network input signal Y(n) from the network and the terminal input signal from the input buffer memory module 21; and if the current time is a dual-ended voice time, output a signal for interrupting coefficient adjustment to the adaptive filter 231.

The terminal input signal outputted from the input buffer memory module 21 to the dual-ended voice detection module 233 is determined according to the employed dual-ended voice detection algorithm. For example, if the Geigel dual-ended voice detection algorithm is employed, X(n), X(n−1), . . . , X(n−L+1) are needed to be outputted to the dual-ended voice detection module 233, where L is a constant and might be determined experientially.

FIG. 3 is a flow chart of an electricity echo cancellation method according to an embodiment of the present invention. As shown in FIG. 3, the method includes the following steps.

Step 301: An RTCP packet is received.

Step 302: A network transmission delay De is calculated as De=A−LSR−DLSR according to an NTP time A at which the RTCP packet arrives and LSR and DLSR carried by the RTCP packet.

Step 303: A network echo delay k is calculated as k=De/t, and the current network echo delay K is updated with k, i.e. K=k, where t is a sampling time interval.

Step 304: An electricity echo signal r(n) is calculated according to a filtering coefficient e(n) at the current time and terminal input signals at the time (n−K) and the time a certain period before the time (n−K).

Particularly, $$r(n) = \sum_{m=0}^{M-1} e(n)_m \cdot X(n - K - m)$$

if the NLMS algorithm is employed, where n is the current time and n≧K+m, $e(n)_m$ is the $m^{th}$ order coefficient of the vector $e(n)_m$, M is the total order of adaptive filtering, and X(n−K−m) is the terminal input signal at the time (n−K−m).

Step 305: The difference between a network input signal Y(n) and the electricity echo signal r(n) is calculated to obtain a network output signal $Y_{out}(n)$.

Step 306: It is determined whether the current time is a dual-ended voice time. If the current time is a dual-ended voice time, step 307 is performed; and if the current time is not a dual-ended voice time, step 308 is performed.

According to the Geigel dual-ended voice detection algorithm, if the condition $|Y_{out}(n)|-C^*\max(|X(n)|, |X(n-1)|, \ldots, |X(n-L+1)|)>0$ is met, the current time is determined a dual-ended voice time; and if the condition is not met, the current time is not determined a dual-ended voice time. C is a constant and usually C=0.5, and L is a constant and may be determined experimentally.

Step 307: The current filtering coefficient e(n) is maintained unchanged, i.e. e(n+1)=e(n), and the process ends.

Step 308: The current filtering coefficient e(n) is adjusted as an adjusted filtering coefficient e(n+1) according to an adaptive filtering algorithm.

Particularly, if the NLMS algorithm is employed, then $$e(n+1) = e(n) + \mu * \frac{\Delta(n)}{P(n-K)} * X(n-K),$$

where, μ is a step factor, satisfying 0<μ<2 and usually μ=0.5; Δ(n) is an error signal and Δ(n)=Y(n)−r(n)=$Y_{out}(n)$; and P(n−K) is a short-time average power of X(n−K) and P(n−K)=$X^T$(n−K)*X(n−K) where $X^T$(n−K) is the transposed vector of X(n−K).

Alternatively, r(n) and e(n+1) can also be calculated through the Least Mean Square (LMS) algorithm, or the Recursive Least Square (RLS) algorithm, and so on.

The above steps 301~303 could be performed before or after the steps 304~308. The steps 301~303 would be performed if only an RTCP packet is received, and the steps 304~308 would be performed if only a terminal input signal is received.

The above process and method are only embodiments of the present invention, which are not intended to limit the invention. Any changes, equivalent replacements and improvements made within the spirit and scope of the present invention should be included in the protecting scope of the present invention.

What is claimed is:

1. An electricity echo cancellation device, wherein the electricity echo cancellation device is deployed in a terminal, comprising a network echo delay computation module, an input buffer memory module and an adaptive filtering module, wherein:

the network echo delay computation module is configured to calculate a network echo delay according to a Real Time Control Protocol (RTCP) packet transmitted from the network;

the input buffer memory module is configured to receive and save a terminal input signal, determine a terminal input signal to be adaptively filtered according to the network echo delay most recently outputted from the network echo delay computation module and the terminal input signal received and saved by the input buffer memory module, and output the terminal input signal to be adaptively filtered to the adaptive filtering module; and the adaptive filtering module is configured to calculate an electricity echo signal according to the terminal input signal to be adaptively filtered, output by the input buffer memory module, and the current filtering coefficient maintained in the adaptive filtering module, subtract the electricity echo signal from a network input signal from the network and output a network output signal derived through the subtraction to the outside.

2. The device according to claim 1, wherein the adaptive filtering module comprises an adaptive filter, a subtracter and a dual-ended voice detection module, wherein:

the adaptive filter is configured to calculate the electricity echo signal according to the terminal input signal outputted from the input buffer memory module and a filtering coefficient maintained in the adaptive filter, output the electricity echo signal to the subtracter, adjust the current filtering coefficient according to the network output signal outputted from the subtracter, and interrupt the adjustment of the current filtering coefficient after receiving a signal for interrupting coefficient adjustment from the dual-ended voice detection module;

the subtracter is configured to subtract the electricity echo signal outputted from the adaptive filter from a network input signal from the network, and output the network output signal derived through the subtraction to the terminal and the adaptive filter; and the dual-ended voice detection module is configured to detect whether the current time is a dual-ended voice time according to the network input signal from the network and the terminal input signal from the input buffer memory module, and if the current time is a dual-ended voice time, output the signal for interrupting coefficient adjustment to the adaptive filter.

3. The device according to claim 1, wherein the terminal input signal outputted from the input buffer memory module to the dual-ended voice detection module is determined according to an employed dual-ended voice detection algorithm.

4. An electricity echo cancellation method, which is applied in a terminal, comprising:

calculating a network echo delay according to a Real Time Control Protocol (RTCP) packet when the RTCP packet arrives;

receiving and saving a terminal input signal;

determining a terminal input signal to be adaptively filtered according to the network echo delay most recently outputted and the terminal input signal received and saved;

calculating an electricity echo signal according to the terminal input signal to be adaptively filtered and the current filtering coefficient maintained;

subtracting the electricity echo signal from a network input signal from the network and outputting a network output signal derived through the subtraction to the outside.

5. The method according to claim 4, wherein calculating the network echo delay according to the RTCP packet comprises:

subtracting, from a Network Time Protocol (NTP) time at which the RTCP packet arrives, a time, carried by the RTCP packet, at which a transmitted packet is most recently received, and further subtracting a time interval between the time at which a transmitted packet is most recently received and the time at which the RTCP packet is transmitted; and dividing the resulting difference derived through the two subtractions by a sampling time interval to obtain the network echo delay.

6. The method according to claim 4, wherein the electricity echo signal is calculated as $$r(n) = \sum_{m=0}^{M-1} e(n)_m \cdot X(n - K - m),$$

where n is the current time, M is the total order of adaptive filtering, K is the updated current network echo delay, r(n) is the current electricity echo signal, $e(n)_m$ is the current filtering coefficient of the $m^{th}$ order, and x(n−K−m) is the terminal input signal at the time (n−K−m).

7. The method according to claim 4, wherein the method further comprises:

determining whether the current time is a dual-ended voice time; and if the current time is a dual-ended voice time, maintaining the current filtering coefficient unchanged, and if the current time is not a dual-ended voice time, adjusting the current filtering coefficient according to the adaptive filtering algorithm.

8. The method according to claim 4, wherein determining whether the current time is a dual-ended voice time comprises:

determining whether the condition $|Y_{out}(n)|−C*\max(|X(n)|,|X(n−1)|, \ldots , |X(n−L+1)|)>0$ is met; and if the condition is met, determining the current time is a dual-ended voice time, and if the condition is not met, determining the current time is not a dual-ended voice time;

where n is the current time, C and L are constants determined experientially, $Y_{out}(n)$ is the network output signal, x(n) is the terminal input signal at the current time, x(n−1) is the terminal input signal at the time (n−1), and x(n−L+1) is the terminal input signal at the time (n−L+1).

9. The method according to claim 4, wherein the current filtering coefficient is adjusted as $$e(n+1) = e(n) + \mu * \frac{\Delta(n)}{P(n-K)} * X(n-K),$$

where n is the current time, μ is a constant, K is the updated current network echo delay, e(n) is the current filtering coefficient, e(n+1) is the adjusted filtering coefficient, Δ(n) is the network output signal, x(n−K) is the terminal input signal at the time (n−K), and P(n−K)=$X^T$(n−K)*X(n−K) where $X^T$(n−K) is the transposed vector of X(n−K).

10. A terminal, comprising an electricity echo cancellation device,
the electricity echo cancellation device comprising a network echo delay computation module, an input buffer memory module and an adaptive filtering module, wherein:
the network echo delay computation module is configured to calculate a network echo delay according to a Real Time Control Protocol (RTCP) packet transmitted from the network;
the input buffer memory module is configured to receive and save a terminal input signal, determine a terminal input signal to be adaptively filtered according to the network echo delay most recently outputted from the network echo delay computation module and the terminal input signal received and saved by the input buffer memory module, and output the terminal input signal to be adaptively filtered to the adaptive filtering module; and
the adaptive filtering module is configured to calculate an electricity echo signal according to the terminal input signal to be adaptively filtered, output by the input buffer memory module, and the current filtering coefficient maintained in the adaptive filtering module, subtract the electricity echo signal from a network input signal from the network and output a network output signal derived through the subtraction to the outside.

11. The terminal according to claim 10, wherein the adaptive filtering module comprises an adaptive filter, a subtracter and a dual-ended voice detection module, wherein:
the adaptive filter is configured to calculate the electricity echo signal according to the terminal input signal outputted from the input buffer memory module and a filtering coefficient maintained in the adaptive filter, output the electricity echo signal to the subtracter, adjust the current filtering coefficient according to the network output signal outputted from the subtracter, and interrupt the adjustment of the current filtering coefficient after receiving a signal for interrupting coefficient adjustment from the dual-ended voice detection module;
the subtracter is configured to subtract the electricity echo signal outputted from the adaptive filter from a network input signal from the network, and output the network output signal derived through the subtraction to the terminal and the adaptive filter; and
the dual-ended voice detection module is configured to detect whether the current time is a dual-ended voice time according to the network input signal from the network and the terminal input signal from the input buffer memory module, and if the current time is a dual-ended voice time, output the signal for interrupting coefficient adjustment to the adaptive filter.

12. The terminal according to claim 11, wherein the terminal input signal outputted from the input buffer memory module to the dual-ended voice detection module is determined according to an employed dual-ended voice detection algorithm.

13. An apparatus for electricity echo cancellation, which is applied in a terminal, comprising:
one or more processors; and memory containing instructions that, when executed by the one or more processors, cause the one or more processors to perform a set of steps comprising:
calculating a network echo delay according to a Real Time Control Protocol (RTCP) packet when the RTCP packet arrives;
receiving and saving a terminal input signal;
determining a terminal input signal to be adaptively filtered according to the network echo delay most recently outputted and the terminal input signal received and saved;
calculating an electricity echo signal according to the terminal input signal to be adaptively filtered and the current filtering coefficient maintained;
subtracting the electricity echo signal from a network input signal from the network and outputting a network output signal derived through the subtraction to the outside.

14. The apparatus for electricity echo cancellation according to claim 13, wherein calculating the network echo delay according to the RTCP packet comprises:
subtracting, from a Network Time Protocol (NTP) time at which the RTCP packet arrives, a time, carried by the RTCP packet, at which a transmitted packet is most recently received, and further subtracting a time interval between the time at which a transmitted packet is most recently received and the time at which the RTCP packet is transmitted; and
dividing the resulting difference derived through the two subtractions by a sampling time interval to obtain the network echo delay.

15. The device according to claim 1, wherein the network echo delay k is calculated as k=De/t;
where De is a network transmission delay and is calculated as De=A−LSR−DLSR according to an NTP time A at which the RTCP packet arrives, and LSR and DLSR are carried by the RTCP packet;
where t is a sampling time interval.

16. The method according to claim 4, wherein the network echo delay k is calculated as k=De/t;
where De is a network transmission delay and is calculated as De=A−LSR−DLSR according to an NTP time A at which the RTCP packet arrives, and LSR and DLSR are carried by the RTCP packet;
where t is a sampling time interval.

17. The terminal according to claim 10, wherein the network echo delay k is calculated as k=De/t;
where De is a network transmission delay and is calculated as De=A−LSR−DLSR according to an NTP time A at which the RTCP packet arrives, and LSR and DLSR are carried by the RTCP packet;
where t is a sampling time interval.

18. The apparatus according to claim 13, wherein the network echo delay k is calculated as k=De/t;
where De is a network transmission delay and is calculated as De=A−LSR−DLSR according to an NTP time A at which the RTCP packet arrives, and LSR and DLSR are carried by the RTCP packet;
where t is a sampling time interval.

* * * * *